H. A. HARVEY.
Bolts and Nuts.
No. 204,036. Patented May 21, 1878.
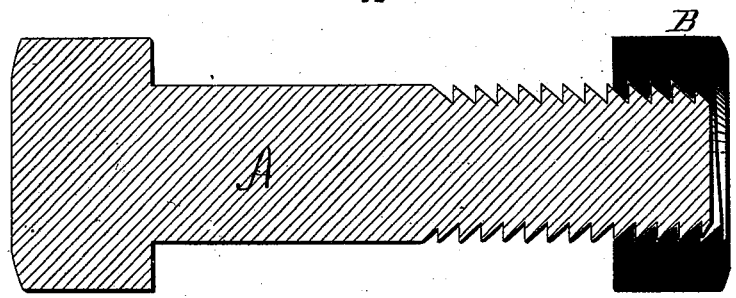
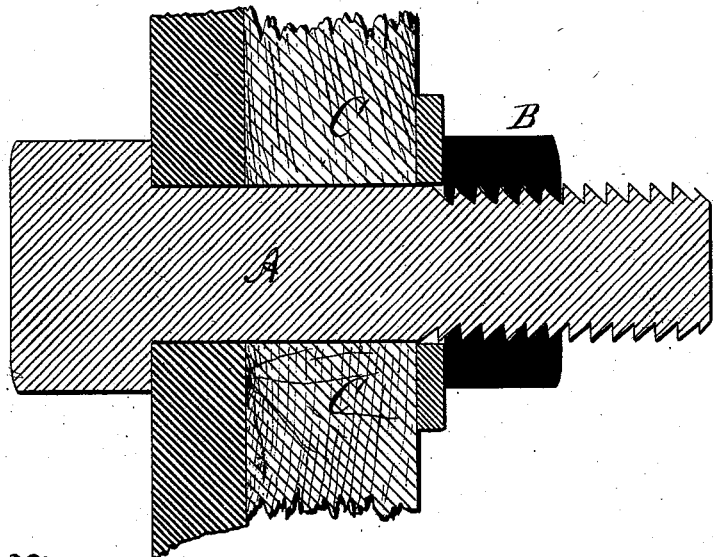

UNITED STATES PATENT OFFICE.

HAYWARD A. HARVEY, OF ORANGE, NEW JERSEY.

IMPROVEMENT IN BOLTS AND NUTS.

Specification forming part of Letters Patent No. 204,036, dated May 21, 1878; application filed November 21, 1877.

*To all whom it may concern:*

Be it known that I, HAYWARD A. HARVEY, of Orange, New Jersey, have invented a certain Improvement in Bolts and Nuts, of which the following is a specification:

My improvement relates to that class of bolts and nuts in which the thread is designed to be so modified in form by the act of jamming the nut home against the object through which the bolt is inserted that the nut will no longer fit that part of the bolt over which it has passed loosely, and hence will be incapable of being removed from the bolt except by the use of excessive force applied torsionally.

Examples of the class of bolts and nuts referred to are shown and described in Letters Patent of the United States Nos. 197,466 and 197,467, granted to me November 27, 1877.

I have found that it occasionally happens in removing a nut so constructed and applied that the bolt-thread is permanently upset to an extent which makes it useless thereafter, and thus occasions the loss of the bolt, which is the more expensive part of the structure.

My invention consists in making the bolt of Bessemer steel and the nut of iron, so that the nut-thread will upset more easily than the bolt-thread, and the nut in the act of removal will be incapable of upsetting the bolt-thread to such an extent as will prevent the bolt from being again used.

The accompanying drawings are as follows: Figure 1 is a central longitudinal section of a screw bolt and nut, having a thread of ratchet form, which is well adapted for the purposes of my invention. Fig. 2 is a similar section, showing the nut jammed home against the object through which the bolt is inserted.

I make the bolt A preferably of Bessemer steel, and the nut B of iron.

The effect of forcibly jamming the nut home against the object C, through which the bolt is inserted, is to upset the threads, as shown in an exaggerated degree in Fig. 2, thus causing the nut to tightly gripe that portion of the bolt which it embraces. Owing to the more yielding character of the material of which the nut is made, the nut-thread will yield back again when the nut is removed without materially modifying the shape of the bolt-thread, and therefore the nut alone may have to be sacrificed if the necessity arises for removing the bolt after it has been applied in use.

Of course it will be understood that by a parity of arrangement the bolt may be sacrificed and the nut preserved. If for any reason it be desired to accomplish this object, the nut will be made of steel and the bolt of iron.

I am aware that it has been proposed to make a bolt with a finished thread out of a hard metal, and to use in connection therewith a nut composed of a softer metal, and having a shallow or unfinished thread, with the object of having the finished thread of the bolt cut its way into the softer metal of the nut, and so cause the nut to adhere firmly to the bolt when the structure is put into use. My invention differs from this in respect of the fact that I provide both the bolt and the nut with finished threads, and I so proportion the relative strength of the two parts of the structure that the work done by the bolt-thread in upsetting the nut-thread, and the strain to which the bolt-thread is subjected by the removal of the nut and the consequent upsetting in the opposite direction of the nut-thread, does not impair the integrity of the bolt-thread, nor destroy its capacity to repeat its work upon a new nut in case the first nut has had its thread so injured as to be thereafter unserviceable.

I claim as my invention—

As a new article of manufacture, a steel screw-bolt and an iron nut provided with ratchet or undercut screw-threads, substantially as and for the purpose set forth.

H. A. HARVEY.

Witnesses:
MARY L. ADAMS,
EDWD. PAYSON.